US008620379B2

(12) United States Patent
Zhodzishsky et al.

(10) Patent No.: US 8,620,379 B2
(45) Date of Patent: Dec. 31, 2013

(54) WINDOWS PORTABLE DEVICES INTERFACE FOR BLUETOOTH LOW ENERGY DEVICES

(75) Inventors: Victor Zhodzishsky, Potomac, MD (US); Ashok Kapur, Frederick, MD (US); Ilya Faenson, Rockville, MD (US); Ron Wong, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 340 days.

(21) Appl. No.: 13/173,170

(22) Filed: Jun. 30, 2011

(65) Prior Publication Data

US 2012/0142271 A1    Jun. 7, 2012

Related U.S. Application Data

(60) Provisional application No. 61/419,911, filed on Dec. 6, 2010.

(51) Int. Cl.
*H04M 1/00* (2006.01)
(52) U.S. Cl.
USPC ...... 455/557; 455/414.1; 455/41.2; 455/3.06; 370/252
(58) Field of Classification Search
USPC ............ 455/557, 414.1, 41.2, 3.06, 418, 419; 370/252, 278
See application file for complete search history.

(56) References Cited

U.S. PATENT DOCUMENTS 7,245,483 B2 * 7/2007 Feague et al. .............. 361/679.3
7,269,388 B2 * 9/2007 Poursabahian et al. ...... 455/41.2
7,873,317 B2 * 1/2011 Hamadi et al. ............... 455/41.2
8,244,745 B2 * 8/2012 Lim .............................. 707/758
8,321,437 B2 * 11/2012 Lim .............................. 707/758
8,447,910 B1 * 5/2013 Yi et al. ......................... 710/315
2004/0176973 A1 * 9/2004 Lapeze et al. ..................... 705/1
2007/0046562 A1   3/2007 Polivy et al.
2007/0169129 A1   7/2007 Polivy et al.

(Continued)

FOREIGN PATENT DOCUMENTS

KR    10 2007 118914    12/2007
KR    10 2008 0037063    4/2008
WO       2009038928 A2    3/2009

OTHER PUBLICATIONS

Korean Office Action in copending related Korean application No. 029101665, mailed Apr. 29, 2013.

(Continued)

*Primary Examiner* — Minh D Dao
(74) *Attorney, Agent, or Firm* — Thomas | Horstemeyer, LLP

(57) ABSTRACT

A method and system are provided in which a Windows Portable Devices (WPD) driver installed and executed on a central device enables one or more applications on that device to interface with a peripheral device, such as a Bluetooth low energy (BLE) device. The peripheral device may utilize a Generic Attribute Profile (GATT) to interface with the WPD driver. Through the WPD driver, the central device may access, transmit, receive, and/or modify information associated with the peripheral device and/or control the peripheral device. The information associated with the peripheral device may include services, characteristics, and/or descriptors. A WPD device and objects that logically or virtually represents the peripheral device may be generated to map attributes of the WPD device to services and/or characteristics associated with the peripheral device. More than one WPD device may be available when multiple peripheral devices are represented in the central device.

20 Claims, 6 Drawing Sheets

(56) References Cited

U.S. PATENT DOCUMENTS

2007/0242061 A1    10/2007  Rhoten et al.
2009/0055735 A1*    2/2009  Zaleski et al. ............... 715/700
2011/0245089 A1*   10/2011  Scott et al. ..................... 506/7
2012/0116548 A1*    5/2012  Goree et al. .................. 700/90
2012/0238216 A1*    9/2012  Hallowell et al. ........... 455/41.3
2013/0070581 A1*    3/2013  Clark et al. ................. 370/216
2013/0109315 A1*    5/2013  Polo et al. .................. 455/41.2
2013/0128022 A1*    5/2013  Bose et al. ..................... 348/77

OTHER PUBLICATIONS

European Search Report in copending related European application No. 11009557.7, mailed Feb. 12, 2012.

* cited by examiner

WINDOWS PORTABLE DEVICES INTERFACE FOR BLUETOOTH LOW ENERGY DEVICES

CROSS-REFERENCE TO RELATED APPLICATIONS/INCORPORATION BY REFERENCE

This patent application makes reference to, claims priority to, and claims benefit from U.S. Provisional Patent Application No. 61/419,911, filed Dec. 6, 2010, which is hereby incorporated herein by reference in its entirety.

FIELD OF THE INVENTION

Certain embodiments of the invention relate to Bluetooth device communication. More specifically, certain embodiments of the invention relate to windows portable devices (WPD) interface for Bluetooth low energy (BLE) devices.

BACKGROUND OF THE DISCLOSURE

Bluetooth low energy (BLE) is an enhancement to the Bluetooth standard that was introduced in Bluetooth version 4.0. Devices using Bluetooth low energy wireless technology may consume a fraction of the power of other Bluetooth-enabled products. In some instances, a Bluetooth low energy device may be able to operate more than a year on a coin-cell battery without recharging. The deployment of these types of devices over a wide range of situations may result in a need for such devices to interface with Windows-based machines.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for windows portable devices interface for Bluetooth low energy devices, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for a Windows Portable Devices interface for Bluetooth low energy devices. In accordance with various embodiments of the invention, a Windows Portable Devices (WPD) driver installed and executed on a central device may enable one or more applications on the central device to interface with a peripheral device, such as a Bluetooth low energy (BLE) device, for example. The central device may be a Windows-based machine, for example. The peripheral device may be communicatively coupled to the central device and may utilize a Generic Attribute Profile (GATT) to interface with the WPD driver. Through the WPD driver, the central device may access, transmit, receive, and/or modify information associated with the peripheral device. Moreover, also through the WPD driver, the central device may control the operation and/or functionality of the peripheral device. The information associated with the peripheral device may include services and characteristics. Each characteristic may have one or more values and/or descriptors. A WPD device that logically or virtually represents the peripheral device may be generated by the WPD driver. The WPD device may comprise one or more WPD objects. WPD object properties may be mapped into services and/or characteristics associated with the peripheral device. The characteristics associated with the peripheral device may comprise one or more values and/or one or more descriptors. In some instances, more than one WPD device may be available when multiple peripheral devices are represented in the central device.

Figure 1:
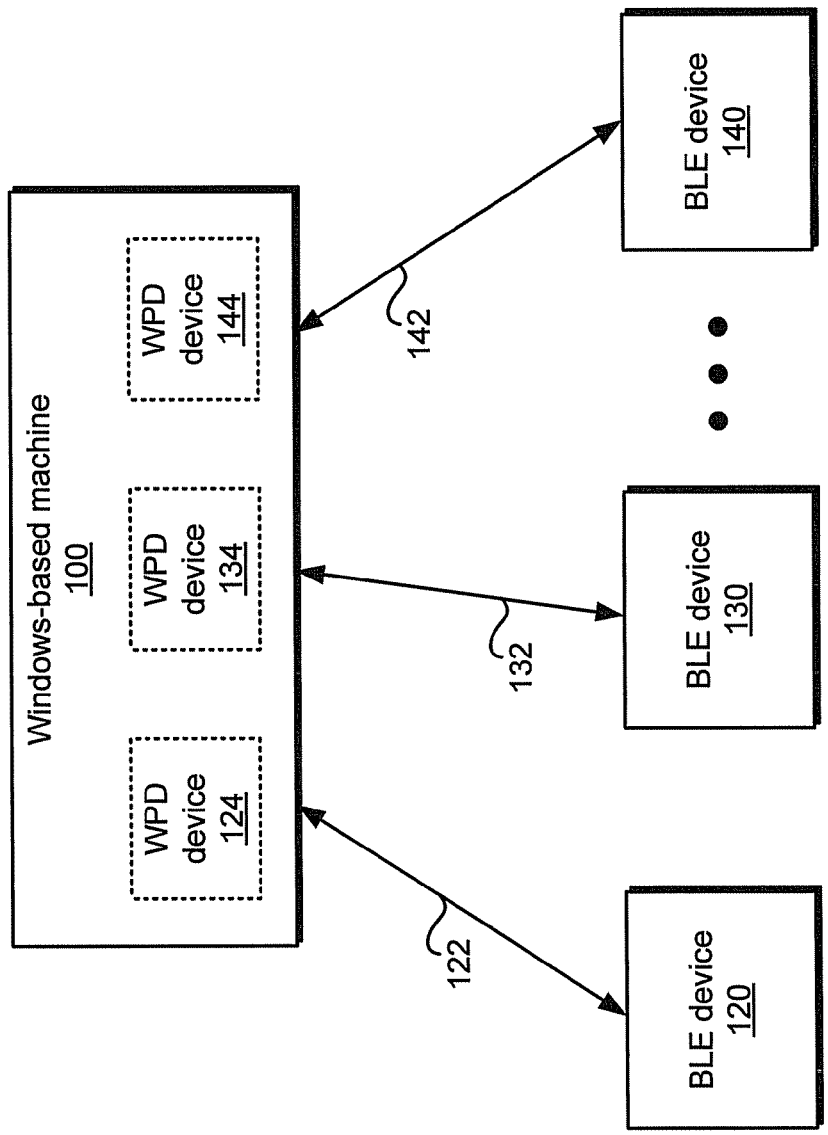
FIG. 1 is a block diagram that illustrates an exemplary Windows-based machine that utilizes a Windows Portable Devices interface to interact with one or more Bluetooth low energy devices, in accordance with an embodiment of the invention.

FIG. 1 is a block diagram that illustrates an exemplary Windows-based machine that utilizes a Windows Portable Devices interface to interact with one or more Bluetooth low energy devices, in accordance with an embodiment of the invention. Referring to FIG. 1, there are shown devices 100, 120, 130, and 140. The device 100 is a Windows-based machine that may comprise suitable logic, circuitry, code, and/or interfaces to support Windows Portable Devices. While the device 100 may be a personal computer, a laptop, or a tablet computer, the device 100 need not be so limited and other machines that support Windows-based operations may be utilized.

The devices 120, 130, and 140 may comprise suitable logic, circuitry, code, and/or interfaces that may be operable to support the use of Bluetooth low energy for Bluetooth communication. In this regard, the devices 120, 130, and 140 may be referred to as BLE devices or BLE-enabled devices, for example. The device 100 may be operable to communicate with the devices 120, 130, and 140 through Bluetooth connections 122, 132, and 142, respectively.

The Windows Portable Devices supported by the device 100 may refer to a type of object-based architecture or platform that may be utilized in a Windows-based machine (i.e., central device) to allow access to one or more external devices (i.e., peripheral devices). The external or peripheral devices may comprise, but need not be limited to, key fobs, portable medical devices, media players, digital still and/or video cameras, mobile phones, or other like devices that may be communicatively coupled to the Windows-based machine. The devices 120, 130, and 140 shown in FIG. 1 may correspond to external or peripheral devices while the device 100 may correspond to the central device. The object-based architecture provided by Windows Portable Devices may comprise one or more Application Programming Interfaces (APIs) that enable the interaction between an application running or executing on the Windows-based machine and one or more of the external devices.

One or more applications running or executing on the device 100 may utilize Windows Portable Devices to perform various operations in connection with an external device. For example, Windows Portable Devices may enable an application to connect to the external device, search and/or retrieve information from the external device, list or enumerate the external devices that are attached or connected, determine the capabilities of the external device, send and/or generate information to be stored in the external device, modify information in the external device, control the external device, and/or detect the presence or absence of the external device.

Also shown in FIG. 1 are WPD devices 124, 134, and 144 that respectively correspond to logical or virtual representations of the devices 120, 130, and 140 in the device 100. The WPD devices 124, 134, and 144 may be utilized by applications executing on the device 100 to perform operations in connection with the devices 120, 130, and 140, respectively. The WPD devices 124, 134, and 144 may be generated to be compatible with the object-based architecture supported by Windows Portable Devices. Each of the WPD devices 124, 134, and 144 may comprise one or more objects, which may be referred to as WPD objects. These objects may have properties, events, or the like. An example of an object is a storage object.

The Bluetooth low energy operation supported by the devices 120, 130, and 140 may refer to a specification that is included in Bluetooth 4.0. Bluetooth low energy introduces new protocols to simplify the development and the implementation of low energy profiles. The new protocols may include an Attribute Protocol (ATT) and a Generic Attribute Profile (GATT), for example.

In operation, the device 120 may communicate with the device 100 by using Bluetooth low energy protocols associated with the Bluetooth connection 122. An application executing on the device 100 may be able to interact with the device 120 through an interface implemented using the Windows Portable Devices object-based architecture supported by the device 100. Such interface may comprise a driver that allows the Bluetooth low energy protocols to communicate with the object-based architecture of Windows Portable Devices. In this regard, the driver may be utilized to generate the WPD device 124 to enable the interaction between the device 100 and the device 120.

Similarly, the devices 130 and 140 may communicate with the device 100 by using Bluetooth low energy protocols associated with the Bluetooth connections 132 and 142, respectively. One or more applications executing on the device 100 may be able to interact with the devices 130 and 140 through interfaces implemented using the Windows Portable Devices object-based architecture supported by the device 100. Those interfaces may comprise a driver that allows the Bluetooth low energy protocols to communicate with the object-based architecture of Windows Portable Devices. In this regard, the drivers may be utilized to generate the WPD devices 134 and 144 to enable the interaction between the device 100 and the devices 130 and 140, respectively.

Figure 2A:
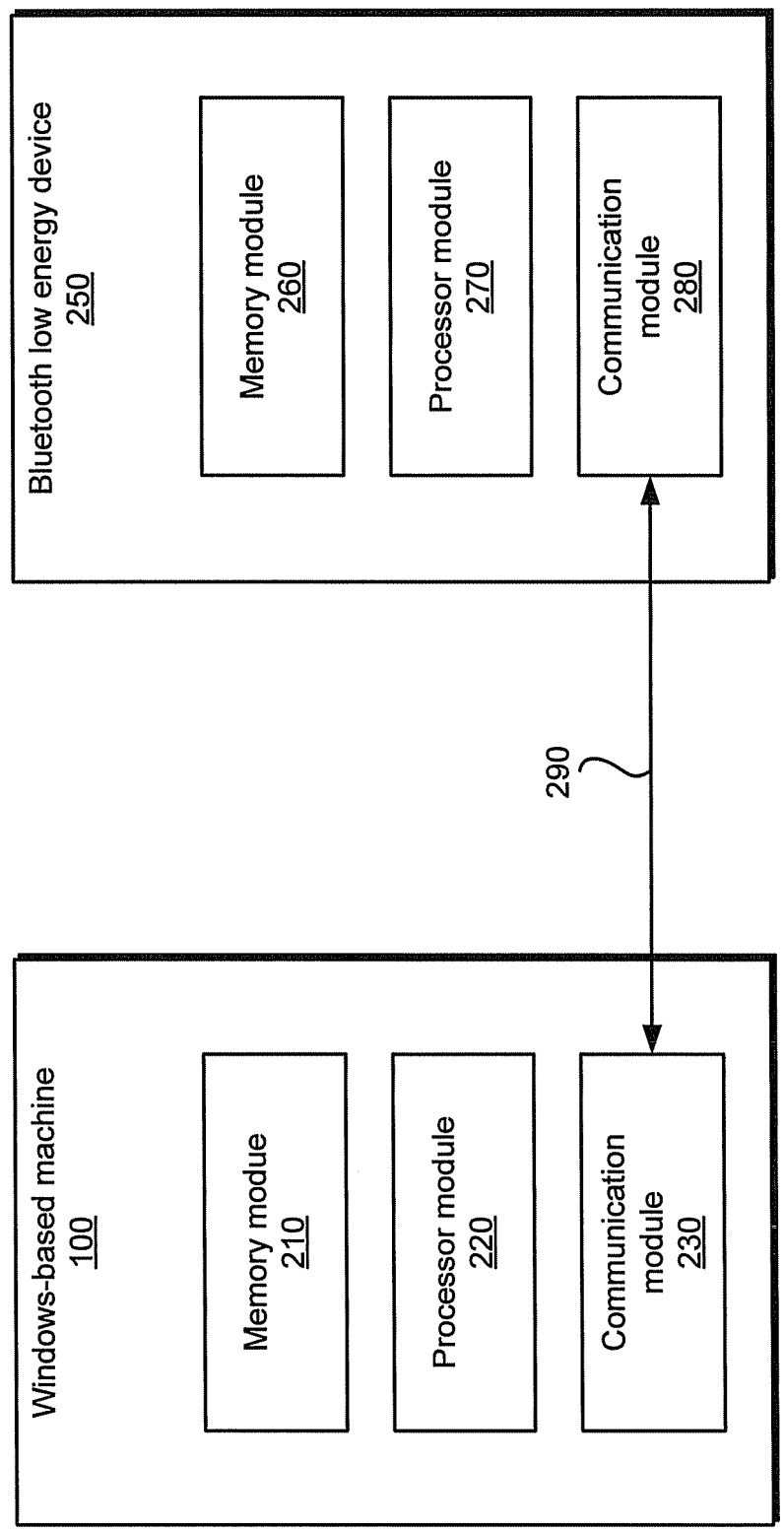
FIGS. 2A and 2B are each diagrams that illustrate examples of the interface between a Windows-based machine and a BLE device through a WPD interface, in accordance with embodiments of the invention.
Figure 2B:
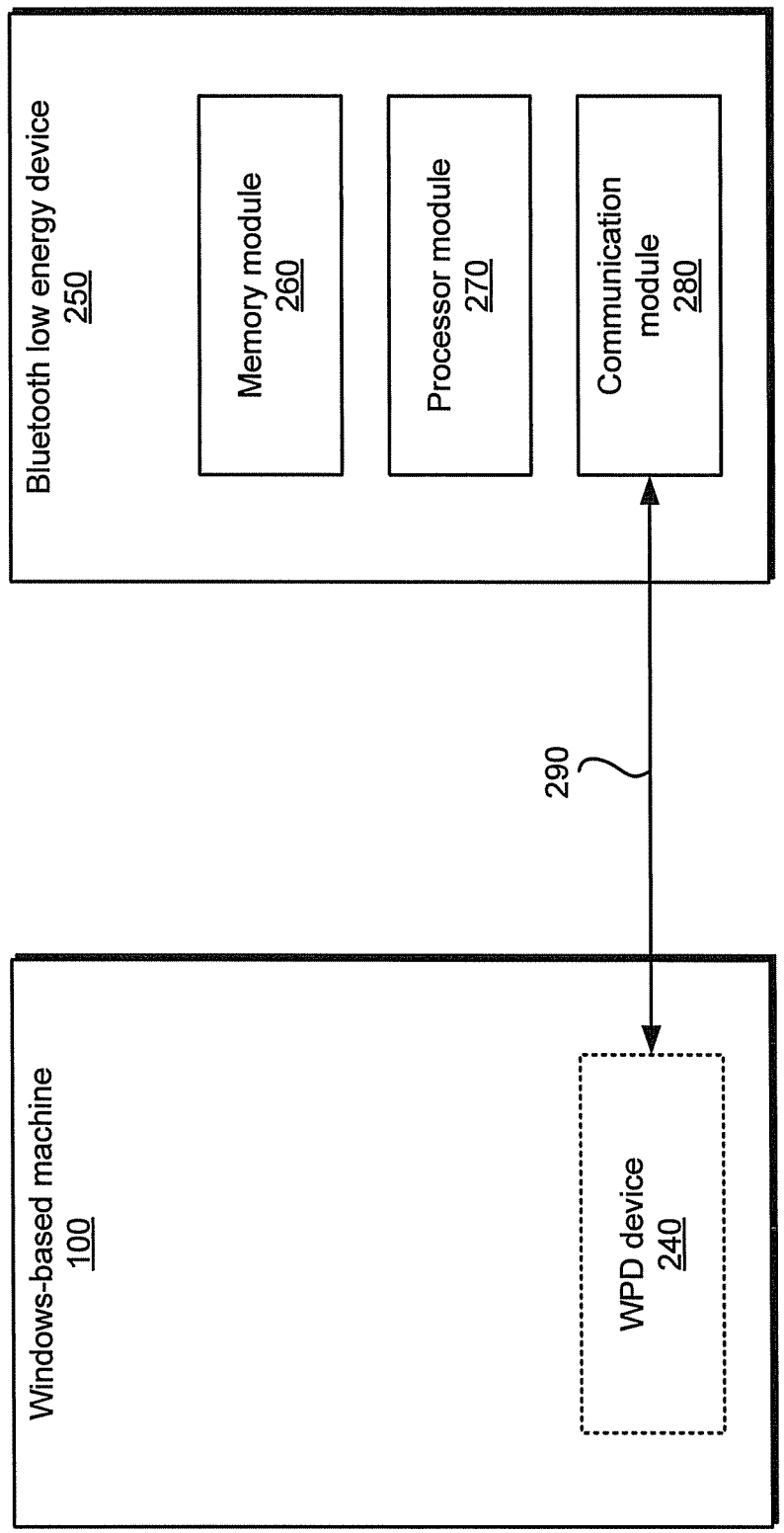

FIGS. 2A and 2B are each diagrams that illustrate examples of the interface between a Windows-based machine and a BLE device through a WPD interface, in accordance with embodiments of the invention. Referring to FIG. 2A, there are shown the Windows-based machine 100 and a Bluetooth low energy device 250. The Bluetooth low energy device 250 may be substantially similar or the same as any one of the devices 120, 130, and 140 shown in FIG. 1.

The Windows-based machine 100 may comprise a memory module 210, a processor module 220, and a communication module 230. The memory module 210 may comprise suitable logic, circuitry, code, and/or interfaces that may be operable to store data and/or code associated with the execution of one or more applications. The memory module 210 may be operable to store data and/or code utilized to support the processes associated with Windows Portable Devices. The memory module 210 may comprise a single memory device or multiple memory devices. A memory device may be an integrated circuit that comprises a Dynamic Random Access Memory (DRAM), a Synchronous DRAM (SDRAM), Double Data Rate SDRAM (DDR SDRAM or DDR2 SDRAM), or FLASH memory, for example.

The processor module 220 may comprise suitable logic, circuitry, code, and/or interfaces that may be operable to run or execute a Windows-based operating system (OS) and one or more applications. The processor module 220 may be operable to support the processes associated with Windows Portable Devices. The processor module 220 may comprise a single processing device or multiple processing devices. A processing device may be an integrated circuit that comprises a central processing unit (CPU) or host processor, a baseband processor, a graphics processor, or some other type of dedicated processor, for example. The processor module 220 may also be operable to handle data and/or control signals associated with the transmission and/or reception operations of the communication module 230.

The communication module 230 may comprise suitable logic, circuitry, code, and/or interfaces that may be operable to communicate with one or more external devices. The communication module 230 may support wireless and/or wired communication with external devices. With respect to wireless communication operations, the communication module 230 may comprise one or more radios (not shown) that are operable to transmit and/or receive radio frequency (RF) signals. For example, the communication module 230 may comprise a Bluetooth radio that may be operable to support Bluetooth low energy protocols and enable communication with the Bluetooth low energy device 250. The communication module 230 may also support other types of radios such as radios used for communication in Wireless Local Area Networks (WLANs), Personal Area Networks (PANs), or cellular networks, for example.

The Bluetooth low energy device 250 may comprise a memory module 260, a processor module 270, and a communication module 280. The memory module 260 may comprise suitable logic, circuitry, code, and/or interfaces that may be operable to store data and/or code associated with the operations of the Bluetooth low energy device 250. The memory module 260 may be operable to store data and/or code utilized to support the processes associated with Bluetooth low energy, for example. Like the memory module 210 described above, the memory module 260 may comprise a single memory device or multiple memory devices.

The processor module 270 may comprise suitable logic, circuitry, code, and/or interfaces that may be operable to run or execute an operating system and one or more applications. The processor module 270 may be operable to support the processes associated with Bluetooth low energy, for example. Like the processor module 220 described above, the processor module 270 may comprise a single processing device or multiple processing devices. The processor module 270 may comprise a baseband processor for handling Bluetooth baseband operations.

The communication module 280 may comprise suitable logic, circuitry, code, and/or interfaces that may be operable to communicate with one or more additional devices. The additional devices may be Bluetooth-enabled devices or may be devices that utilize a different wireless communication technology, such as WLAN, for example. In this regard, the communication module 280 may comprise one or more radios (not shown) that are operable to transmit and/or receive RF signals. For example, the communication module 280 may comprise a Bluetooth radio that may be operable to support Bluetooth low energy protocols and enable communication with the Windows-based machine 100.

The Bluetooth low energy device 250 may be operable to support various Bluetooth-related protocols, profiles, and/or processes. The Bluetooth protocol stack may be implemented by a Bluetooth controller stack that is operable to handle the timing critical radio interface and a Bluetooth host stack that is operable to handle high level data. The Bluetooth controller stack may be implemented utilizing the communication module 280, which may comprise the Bluetooth radio, and the processor module 270, which may comprise a processing device such as a microprocessor, for example. The Bluetooth host stack may be implemented as part of the OS running on the processor module 270 or as an instantiation of a package on top of the OS. In some instances, the Bluetooth controller stack and the Bluetooth host stack may run or execute on the same processing device in the processor module 270.

In operation, the Bluetooth low energy device 250 may communicate with the Windows-based machine 100 by using Bluetooth low energy protocols in a Bluetooth connection 290. An application executing on the processor module 220 of the Windows-based machine 100 may be able to interact with the Bluetooth low energy device 250 through an interface implemented using the Windows Portable Devices object-based architecture supported by the Windows-based machine 100. Such interface may comprise a driver that allows the Bluetooth low energy protocols to communicate with the object-based architecture of Windows Portable Devices. In this regard, the driver may be utilized to generate a WPD device 240 as shown in FIG. 2B to enable the interaction between the Windows-based machine 100 and the Bluetooth low energy device 250. The WPD device 240 is a logical or virtual representation of the Bluetooth low energy device 250 supported by the Windows Portable Devices object-based architecture in the Windows-based machine 100.

Figure 3:
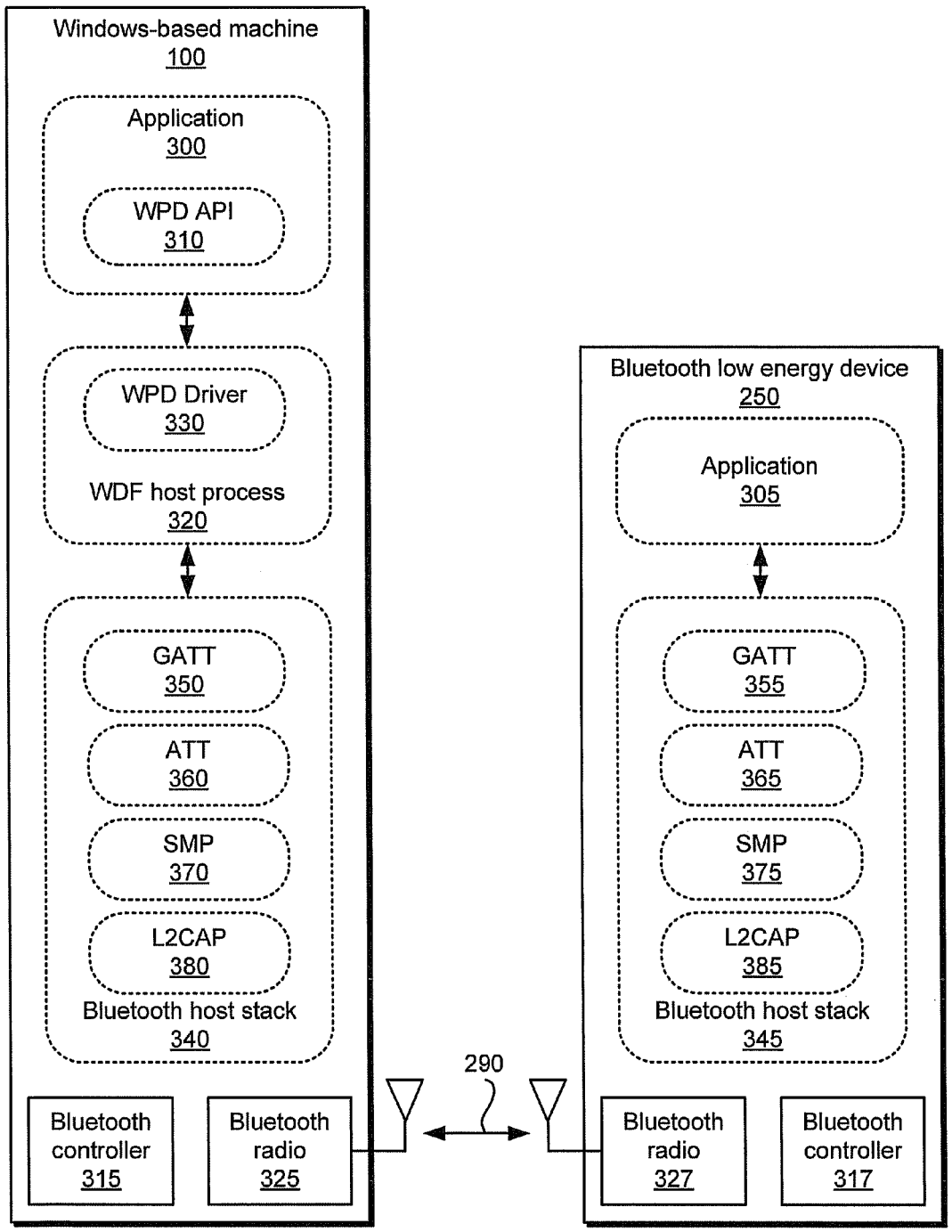
FIG. 3 is a diagram that illustrates an exemplary WPD architecture for interfacing a Windows-based machine and a BLE device, in accordance with an embodiment of the invention.

FIG. 3 is a diagram that illustrates an exemplary WPD architecture for interfacing a Windows-based machine and a BLE device, in accordance with an embodiment of the invention. Referring to FIG. 3, there are shown the Windows-based machine 100 and the Bluetooth low energy device 250. With respect to the Windows-based machine 100, there are shown an application 300 and Windows Driver Foundation (WDF) host process 320, both of which may be part of a WPD architecture supported by the Windows-based machine 100. An example of a WDF host process 320 is a Wudfhost.exe process. The application 300 may comprise one or more APIs 310 for use with Windows Portable Devices. The APIs 310 may be referred to as WPD APIs, for example. The WDF host process 320 may comprise a driver 330 for use with Windows Portable Devices. The driver 330 may be referred to as a WPD driver, for example.

The driver 330 may be utilized to generate or instantiate a WPD device associated with the Bluetooth low energy device 250. The WPD device may then be utilized by the application 300 to interact with the Bluetooth low energy device 250. The WPD device may correspond to a logical or virtual representation of the Bluetooth low energy device 250 that may include attributes associated with the Bluetooth low energy device 250. The WPD device may comprise one or more objects to represent the various attributes of the Bluetooth low energy device 250, for example.

Also shown in FIG. 3 is a Bluetooth host stack 340, which may run or execute on the Windows-based machine 100. The Bluetooth host stack 340 may comprise various protocols and profiles, including but not limited to a GATT 350, an ATT 360, a low energy Security Manager Protocol (SMP) 370, and a Logical Link Control And Adaptation Protocol (L2CAP) 380. The ATT 360 may be operable as a wire protocol while the GATT 350 may be operable as a protocol that describes how ATT is used in the composition of services. For example, the GATT 350 may be operable to define how ATT attributes are grouped together into services and to describe the characteristics associated with the services. Thus, the GATT 350 and the ATT 360 may utilize characteristics to describe the state of a device and services to describe how those characteristics are related to each other and how they are used. The SMP 370 may be operable for pairing and transport specific key distribution. The L2CAP 380 may be operable to multiplex data between higher layer protocols, segment and reassemble packages, manage multicast data transmission. In some instances, the SMP 370 may be bound to the L2CAP 380.

With respect to the Windows-based machine 100, there are shown a Bluetooth controller 315 and a Bluetooth radio 325. The Bluetooth controller 315 may comprise suitable logic, circuitry, code, and/or interfaces that are operable to control the Bluetooth radio interface. The Bluetooth controller 315 may be part of the processor module 220 and/or of the communication module 230 shown in FIG. 2B. The Bluetooth controller 315 may be utilized to implement a Bluetooth controller stack, for example. The Bluetooth radio 325 may comprise suitable logic, circuitry, code, and/or interface that may be operable to wirelessly communicate with a Bluetooth radio on another device.

With respect to the Bluetooth low energy device 250, there are shown an application 305 and a Bluetooth host stack 345. The Bluetooth host stack 345 may comprise various protocols and profiles, including but not limited to a GATT 355, an ATT 365, an SMP 375, and an L2CAP 385. The protocols shown in connection with the Bluetooth host stack 345 may be substantially similar to those shown in connection with the Bluetooth host stack 340. Also with respect to the Bluetooth low energy device 250, there are shown a Bluetooth controller 317 and a Bluetooth radio 327, which are substantially similar to the Bluetooth controller 315 and the Bluetooth radio 325, respectively.

In operation, the application 300 may communicate with the driver 330 through the API 310 by opening device handles and sending input/output (I/O) control codes. Although not shown, the API 310 and the driver 330 may utilize serializers to pack and unpack commands and/or parameters in buffers. The driver 330 may be utilized to generate a WPD device used by the application 300 to interact with the Bluetooth low energy device 250. The driver 330 may communicate with the Bluetooth host stack 340 based on the low energy protocols GATT 350 and ATT 360. The services and/or characteristics associated with the Bluetooth low energy device 250 may be communicated to the driver 330, which in turn may map the information into the appropriate object attributes as defined by the Windows Portable Devices. The characteristics associated with the Bluetooth low energy device 250 may comprise one or more values and/or one or more descriptors, for example.

The application 305 in the Bluetooth low energy device 250 may be associated with certain functionality provided by the device. The application 305 may be utilized to obtain information from the Bluetooth low energy device 250, such as information related to an operation, feature, or capability of the Bluetooth low energy device 250. Such information may be communicated from the Bluetooth low energy device 250 to the Windows-based machine 100 through the Bluetooth connection 290 by having the information pass from the Bluetooth host stack 345 to the Bluetooth host stack 340. When the information is received by the WDF host process 320 from the Bluetooth host stack 340, the information may be mapped into the attributes of a WPD device representing the Bluetooth low energy device 250 by the WPD driver 330. Accordingly, the application 300 may access the information associated with the Bluetooth low energy device 250 from the WPD device.

Similarly, controls or commands provided by the application 300 may make their way to the Bluetooth low energy device 250 through the WPD device that is available in the Windows-based machine 100. For example, the application 300 may communicate a registration to a particular descriptor of a characteristic associated with the Bluetooth low energy device 250 to notify the application 300 when that characteristic has changed. Once the registration has been made on the descriptor, if the characteristics associated with that descriptor changes, a notification may be provided to the application 300 from the Bluetooth low energy device 250.

Another example of the operation described in connection to FIG. 3 is when the Bluetooth low energy device 250 is a proximity fob that has a battery service and a battery level characteristic. In this example, the driver 330 may expose a method by which the application 300 can read the battery level of the Bluetooth low energy device 250. For example, the application 300, through the driver 330, may read the value of the battery level from attributes in a WPD device representing the Bluetooth low energy device 250. The attribute information may have been obtained from information produced by the application 305 in the Bluetooth low energy device 250. Thus, when the application 300 asks the driver 330 to read the battery level, the driver 330 may use ATT and GATT protocols to talk to the proximity fob, determine the current value of the battery level, and provide the information as an attribute in the WPD device. The application 300 may then access the information from the WPD device. This information may be useful to determine the remaining battery life of the Bluetooth low energy device 250 and a corresponding action to take.

In yet another example of the operation described in connection to FIG. 3, the Bluetooth low energy device 250 may be a thermometer that has a temperature service and a temperature value characteristic. In this example, the driver 330 may expose a method by which the application 300 can read the temperature value of the Bluetooth low energy device 250 from a WPD device representing the Bluetooth low energy device 250. Thus, when the application 300 asks the driver 330 to read the current temperature level, the driver 330 may use ATT and GATT protocols to talk to the thermometer, determine the current value of the temperature level, and provide the information as an attribute in the WPD device. The application 300 may then access the information from the WPD device.

Other examples include using the application 300 and the driver 330 to write a value to an alert characteristic of a key fob to cause the key fob to beep, and using the application 300 and the driver 330 to read a weight value characteristic from a weight scale to display the value of the weight.

While the examples described above typically relate to Bluetooth low energy devices, the invention need not be so limited. Other devices may also be utilized such as devices that enable the use of GATT or other like protocol or profile to interface with devices that utilize Windows Portable Devices. These devices may be referred to as GATT-enabled devices and may include Bluetooth low energy devices, for example.

Moreover, while the examples described above with respect to FIG. 3 relate to a single Bluetooth low energy device 250 and a single application 300 in the Windows-based machine 100, the invention need not be so limited. For example, multiple peripheral devices may result in multiple WPD devices in the Windows-based machine 100. One or more applications in the Windows-based machine 100 may be utilized to access one or more of the WPD devices.

Figure 4:
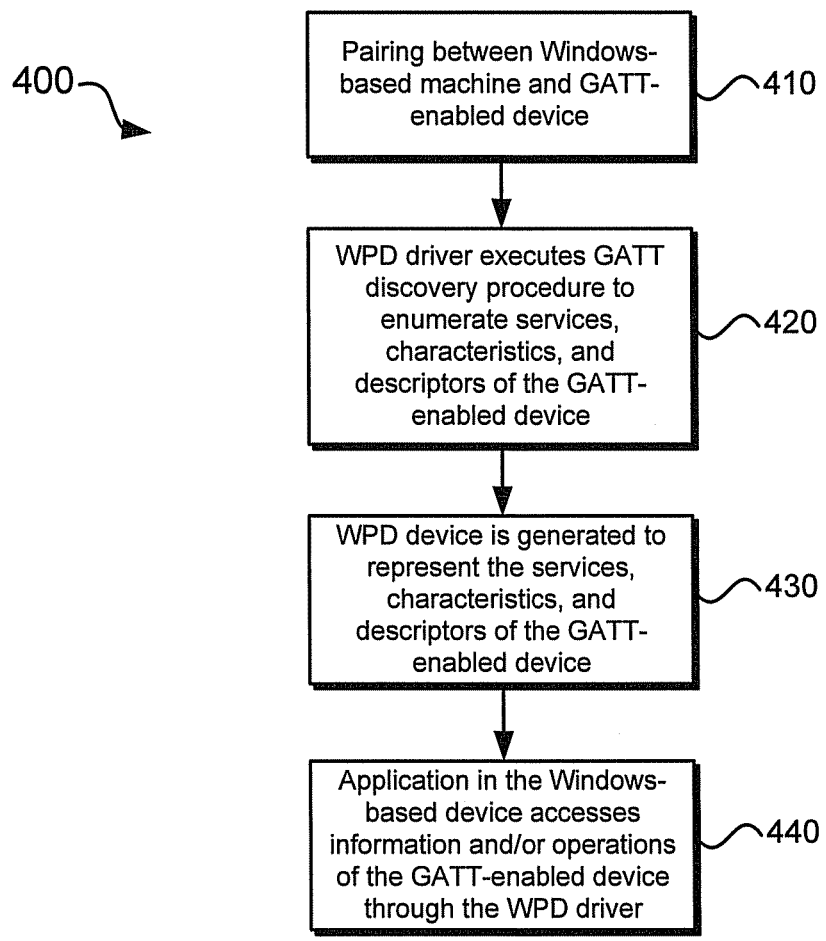
FIG. 4 is a flow chart that illustrates examples of operations associated with a WPD interface for GATT-enabled devices, in accordance with an embodiment of the invention.

FIG. 4 is a flow chart that illustrates examples of operations associated with a WPD interface for GATT-enabled devices, in accordance with an embodiment of the invention. Referring to FIG. 4, there is shown a flow chart 400 in which, at step 410, a Windows-based machine and a GATT-enabled device may be paired. The Windows-based machine may be the Windows-based machine 100 described above, for example. The GATT-enabled device may be one of the devices 120, 130, 140, and the Bluetooth low energy device 250 described above, for example. At step 420, a WPD driver on the Windows-based machine may execute a GATT discovery procedure to enumerate services, characteristics, and descriptors of the GATT-enabled device. At step 430, the WPD driver may generate a WPD device on the Windows-based machine with attributes that represent the services and/or characteristics associated with the GATT-enabled device. The WPD device may comprise one or more objects, the properties of those objects being mapped to the services and/or characteristics associated with the GATT-enabled device. At step 440, the application running on the Windows-based machine may access information and/or operations of the GATT-enabled device through the WPD driver. Such information may be provided by the WPD driver to the WPD device for the application to access.

Figure 5:
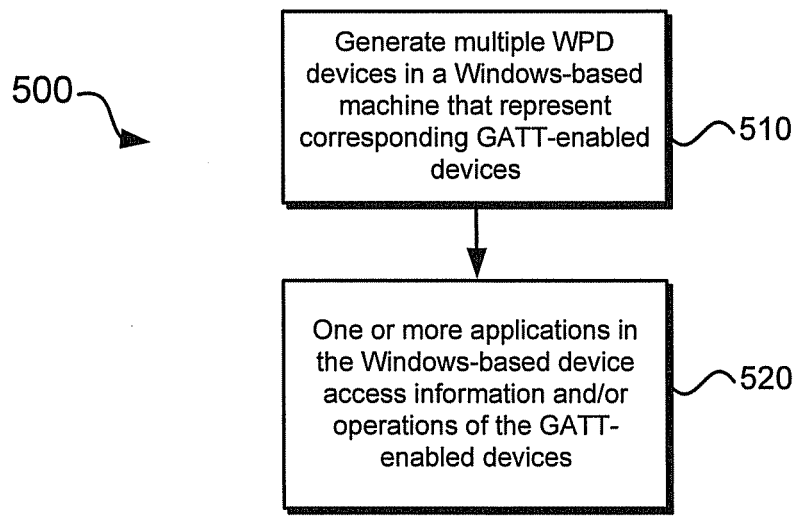
FIG. 5 is a flow chart that illustrates another example of operations associated with a WPD interface for GATT-enabled devices, in accordance with an embodiment of the invention.

FIG. 5 is a flow chart that illustrates another example of operations associated with a WPD interface for GATT-enabled devices, in accordance with an embodiment of the invention. Referring to FIG. 5, there is shown a flow chart 500 in which, at step 510, more than one WPD device may be generated in a Windows-based machine such as the Windows-based machine 100 described above. Each of the WPD devices may be generated by a WPD driver associated with the type of GATT-enabled device being represented by the WPD device.

At step 520, one or more applications in the Windows-based machine, such as the application 300 described above, for example, may access information and/or operations of the GATT-enabled devices through the WPD devices and the WPD drivers. For example, an application may be utilized to manage the battery level in more than one Bluetooth low energy device. Such application may access attribute information from the various WPD devices that represent the Bluetooth low energy devices in order to determine the current battery level in each of those devices.

In accordance with an embodiment of the invention, a central device, such as the Windows-based machine 100, for example, may execute a WPD driver to enable one or more applications on the central device to interface with a peripheral device. The peripheral device may be one of the devices 120, 130, and 140, and the Bluetooth low energy device 250, for example. The WPD driver may be substantially the same or similar to the driver 330 described above with respect to FIG. 3. Moreover, the peripheral device may be communicatively coupled to the central device and may utilize GATT to interface with the WPD driver. Once the WPD driver is being executed, information associated with the peripheral device may be accessed through the WPD driver. The accessed information may comprise one or more services and/or one or more characteristics associated with the peripheral device. The characteristics may comprise one or more values and/or one or more descriptors, for example.

A WPD device that represents the peripheral device may be generated in the central device. The WPD device may comprise one or more objects that may be referred to as WPD objects. The central device may map, through the WPD driver, the properties (e.g., attributes) of the WPD objects to one or more services and/or one or more characteristics associated with the peripheral device. With such mapping, the application may access the WPD device to interact with the peripheral device.

The central device may be operable to control, through the WPD driver, one or more functions of the peripheral device. The central device may be operable to enumerate one or more services and/or one or more characteristics associated with the peripheral device. The central device may be operable to transmit, through the WPD driver, a registration to the peripheral device to notify the central device when one or more characteristics associated with the peripheral device have changed. The central device may also be operable to receive, through the WPD driver, an indication from the peripheral device that one or more characteristics associated with the peripheral device have changed. The central device may be operable to modify, through the WPD driver, one or more characteristics associated with the peripheral device. Communication between the central device and the peripheral device may occur through a Bluetooth host stack in the central device and a Bluetooth host stack in the peripheral device, both of which utilize ATT and GATT.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for a WPD interface for Bluetooth low energy devices.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   executing, on a central device, a Windows Portable Devices (WPD) driver to enable one or more applications on central device to interface with a peripheral device, wherein:
   the peripheral device is communicatively coupled to the central device; and
   a Generic Attribute Profile (GATT) is utilized to interface the central device with the peripheral device; and
   accessing, through the WPD driver, information associated with the peripheral device.

2. The method of claim 1, wherein the accessed information comprises one or more services and/or one or more characteristics associated with the peripheral device.

3. The method of claim 1, comprising:
   generating, in the central device, a WPD device that represents the peripheral device, the WPD comprising one or more WPD objects;
   mapping, through the WPD driver, one or more attributes of the WPD device to one or more services and/or one or more characteristics associated with the peripheral device; and
   accessing, by the one or more applications, the one or more attributes of the WPD device.

4. The method of claim 1, wherein the peripheral device comprises a Bluetooth low energy (BLE) device.

5. The method of claim 1, comprising controlling, through the WPD driver, one or more functions associated with the peripheral device.

6. The method of claim 1, comprising enumerating one or more services and/or one or more characteristics associated with the peripheral device.

7. The method of claim 1, comprising transmitting, through the WPD driver, a registration to the peripheral device to notify the central device when one or more characteristics associated with the peripheral device have changed.

8. The method of claim 1, comprising receiving, through the WPD driver, an indication from the peripheral device that one or more characteristics associated with the peripheral device have changed.

9. The method of claim 1, comprising modifying, through the WPD driver, one or more characteristics associated with the peripheral device.

10. The method of claim 1, comprising communicating between a Bluetooth host stack in the central device and a Bluetooth host stack in the peripheral device.

11. A system, comprising:
    one or more processors and/or circuits in a central device that are operable to:
    execute a Windows Portable Devices (WPD) driver to enable one or more applications on the central device to interface with a peripheral device, wherein:
    the peripheral device is communicatively coupled to the central device; and a Generic Attribute Profile (GATT) is utilized to interface the central device with the peripheral device; and access, through the WPD driver, information associated with the peripheral device.

12. The system of claim 11, wherein the accessed information comprises one or more services and/or one or more characteristics associated with the peripheral device.

13. The system of claim 11, wherein the one or more processors and/or circuits are operable to:

generate a WPD device that represents the peripheral device, the WPD comprising one or more WPD objects;

map, through the WPD driver, one or more attributes of the WPD device to one or more services and/or one or more characteristics associated with the peripheral device; and access, by the one or more applications, the one or more attributes of the WPD device.

14. The system of claim 11, wherein the peripheral device comprises a Bluetooth low energy (BLE) device.

15. The system of claim 11, wherein the one or more processors and/or circuits are operable to control, through the WPD driver, one or more functions associated with the peripheral device.

16. The system of claim 11, wherein the one or more processors and/or circuits are operable to enumerate one or more services and/or one or more characteristics associated with the peripheral device.

17. The system of claim 11, wherein the one or more processors and/or circuits are operable to transmit, through the WPD driver, a registration to the peripheral device to notify the central device when one or more characteristics associated with the peripheral device have changed.

18. The system of claim 11, wherein the one or more processors and/or circuits are operable to receive, through the WPD driver, an indication from the peripheral device that one or more characteristics associated with the peripheral device have changed.

19. The system of claim 11, wherein the one or more processors and/or circuits are operable to modify, through the WPD driver, one or more characteristics associated with the peripheral device.

20. The system of claim 11, wherein the one or more processors and/or circuits are operable to communicate between a Bluetooth host stack in the central device and a Bluetooth host stack in the peripheral device.

* * * * *